Figures 1, 2, 3:
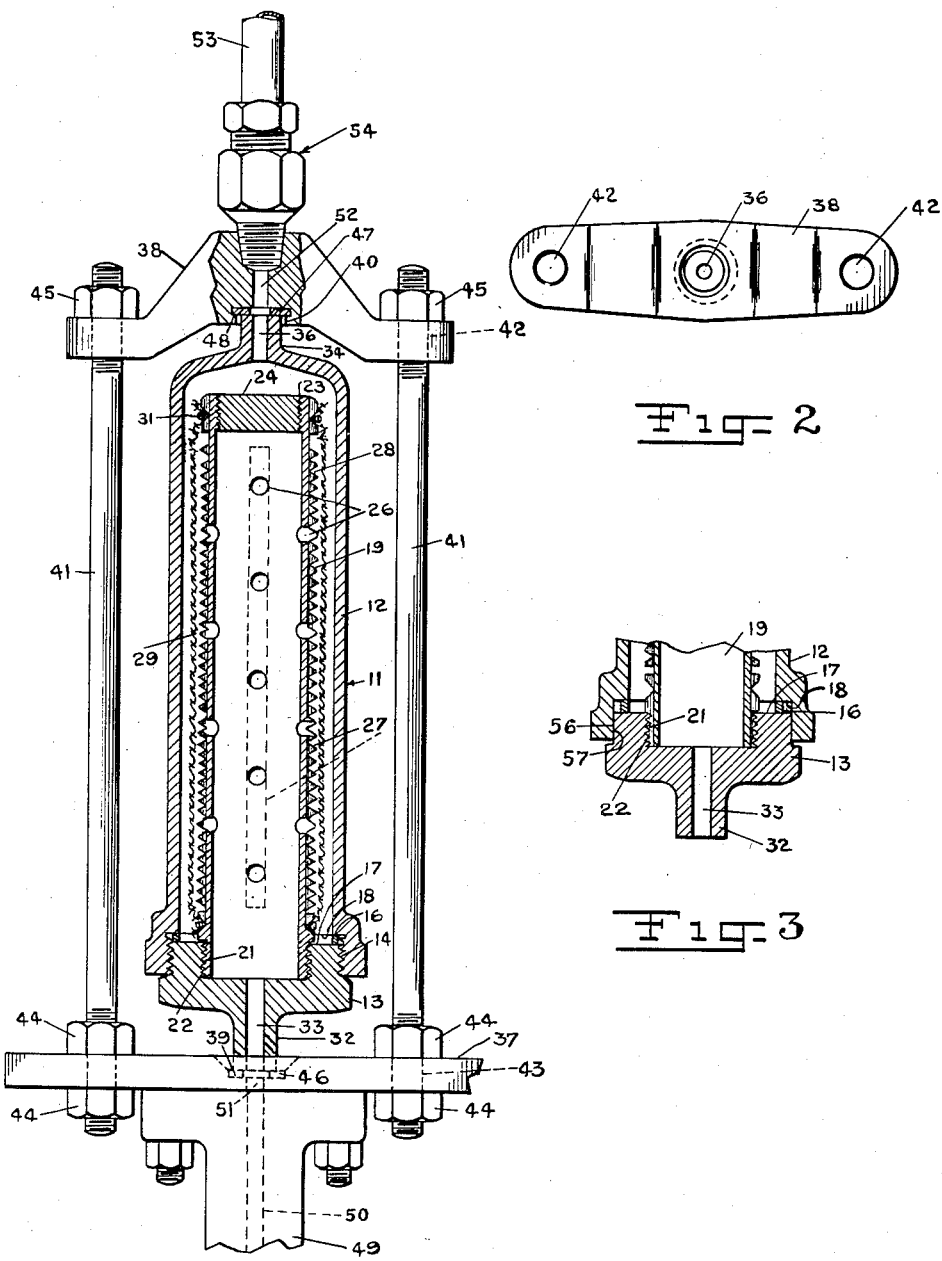

INVENTORS
DANA L. BAILEY.
ROBERT C. BARD.
BY
ATTORNEYS.

Patented Nov. 13, 1951

2,574,521

UNITED STATES PATENT OFFICE 2,574,521

CANDLE FILTER

Dana L. Bailey, Rock Hill, S. C., and Robert C. Bard, Dumont, N. J., assignors to Celanese Corporation of America, a corporation of Delaware Application August 7, 1948, Serial No. 43,044

2 Claims. (Cl. 210—164)

This invention relates to spinning apparatus, and relates more particularly to a novel candle filter mount and to a novel candle filter adapted for use with said mount.

In the production of artificial filamentary materials, a solution or melt of filament-forming material is pumped through a spinning jet containing one or more orifices into a setting medium. The diameter of the spinning orifices will vary depending upon the size of the filaments desired, but the spinning orifices may have a diameter as low as 0.05 to 0.1 millimeter, or even less. If there are any solid impurities in the spinning solution or melt, they will tend to lodge in and clog one or more of the orifices which will result in the production of a defective yarn. It is, therefore, customary to filter the spinning solution or melt several times to remove any solid impurities therefrom and to effect a final filtration of the solution or melt by means of a candle filter mounted in the line leading from the spinning pump to the spinning jet. The filtering material in the candle filter must be replaced from time to time, and in the past this has necessitated removal of the pipe-fittings at each end of the candle filter and disassembly of the candle filter by unscrewing its casing from its base. Considerable labor is necessary to effect a replacement of the filtering material in this manner and there is always the possibility that the pipe-fittings will become damaged or worn after use.

An important object of this invention is to provide a spinning apparatus including a novel candle filter and filter mount adapted for use therewith, which will be free from the foregoing and other disadvantages and which will be especially simple in construction and efficient in use.

A further object of this invention is to provide a spinning apparatus including a novel candle filter and filter mount adapted for use therewith, which will avoid the necessity of removing any pipe fittings to replace the candle filter.

Still another object of this invention is to provide a novel candle filter which may be more readily disassembled than candle filters hitherto employed.

Other objects of this invention, together with certain details of construction and arrangements of parts, will be apparent from the following detailed description and claims.

A preferred embodiment of our invention is illustrated in the accompanying drawings in which, Fig. 1 is an elevational view partly in section of the candle filter and the mounting therefor, Fig. 2 is a top plan view of the yoke forming a portion of the mounting for the candle filter, and Fig. 3 is a fragmentary cross-sectional view of one end of a candle filter somewhat modified in construction.

Referring now to the drawings for a detailed description of our invention, a candle filter indicated generally by reference numeral 11 includes a casing 12 which is fastened to a base 13 by means of an internally threaded section 14. A liquid tight seal is effected between the casing 12 and the base 13 by means of a gasket 16, which is seated between an inner surface 17 of the base and a shoulder 18 on the casing. A filter tube 19 is mounted axially of and concentric to the casing 12 and has an externally threaded section 21 engaging an internally threaded bore 22 in the base 13. The free end of the filter tube is threaded internally as at 23 and is closed by means of a plug 24. The filter tube 19 is also provided with apertures 26 which extend from the interior of the filter tube to intersect longitudinal channels 27 spaced about the surface of the filter tube. Circular grooves 28 join the channels 27 on the surface of the filter tube and cooperate therewith and the apertures 26 to effect a uniform distribution of the material being filtered over the surface of the filter tube. Filtration is effected by means of a filter cloth 29 which encircles the filter tube and is held in place at each end by any suitable means such as ties 31.

The base 13 is provided with a neck 32 having an aperture 33 for admission of the material to be filtered and the top of casing 12 is provided with a constricted portion or neck 34 having an aperture 36 to permit the filtered material to leave the candle filter. The candle filter 11 is mounted between a plate 37 and a yoke 38 with the neck 32 seated in a bore 39 in the plate 37, and with the constricted portion 34 seated in a similar bore 40 in the yoke 38. The plate 37 and the yoke 38 are held together by threaded tie rods 41 which pass through apertures 42 in the yoke 38 and apertures 43 in the plate 37. The tie rods are fastened at one end to the plate 37 by nuts 44 and have nuts 45 at the other end thereof, the latter nuts bearing against the top of the yoke 38. A washer 46 in the bore 39 and a similar washer 47 in the counterbore 48 at the base of the bore 40 provide liquid-tight seals between the candle filter and the mounting members when the nuts 45 are tightened. To replace the candle filter 11, it is simply necessary to loosen the nuts 45 and draw the filter from between the mounting means and replace it with another.

The material to be filtered enters the candle filter 11 from any suitable spinning pump (not shown) through a support 49 having a passageway 50. The passageway 50 opens into a passageway 51 in the plate 37 which in turn leads into the interior of the filter tube 19 through the aperture 33. After passing through the filter cloth 29 into the casing 12 the filtered material leaves the candle filter through the aperture 36 and flows along a passageway 52 in the yoke 38 to a pipe 53. The yoke 38 and the pipe 53 are fastened to each other by means of a pipe coupling indicated generally by reference numeral 54. From the pipe 53, the filtered material passes to any suitable spinning means (not shown). The pipe 53 is constructed so as to allow the yoke 38 to be moved sufficiently for removal and insertion of a candle filter when the nuts 45 are loosened.

In Fig. 3 a modified construction for the candle filter is shown in which the threaded section 14 has been eliminated, and instead there is provided a smooth bore 56 on the interior of the casing 12, and there is also provided a mating section 57 on the exterior of the base 13. The fit between the bore 56 and its mating section 57 need not be liquid tight since the gasket 16 is sufficient to produce a liquid tight seal between them when the gasket is compressed by tightening the nuts 45. This construction of the candle filter is particularly effective since it permits the casing 12 to be more easily removed from the base 13 for access to the filter tube and/or replacement of the filter cloth.

It is to be understood that the foregoing detailed description is given merely by way of illustration and that many variations may be made therein without departing from the spirit of our invention.

Having described our invention, what we desire to secure by Letters Patent is:

1. In a spinning apparatus having filtering means between the spinning pump and the spinning jet, an apertured plate operatively connected to the spinning pump outlet, an apertured yoke operatively connected to the spinning jet, a candle filter supported by said plate and said yoke, said candle filter including a base having an internally threaded flange, a filter tube carried by said base in threaded engagement therewith, a cylindrical casing concentric with said filter tube and supported on said base, a neck integral with said base and having a passageway opening into the interior of said filter tube, a neck integral with said casing and having a passageway opening into the interior of said casing, and tie rods operatively connecting said plate and said yoke to hold said candle filter in operative position, the construction and arrangement being such that the neck on said base and the neck on said casing are slidably engaged by said plate and said yoke, respectively, and the candle filter may be readily removed from the holding means.

2. In a spinning apparatus having filtering means between the spinning pump and the spinning jet, an apertured plate operatively connected to the spinning pump outlet, an apertured yoke operatively connected to the spinning jet, a candle filter supported by said plate and said yoke, said candle filter including a base having an internally threaded flange, a filter tube carried by said base in threaded engagement therewith, a cylindrical casing concentric with said filter tube and supported on said base in sliding contact with said base, a neck integral with said base and having a passageway opening into the interior of said filter tube, a neck integral with said casing and having a passageway opening into the interior of said casing, and tie rods operatively connecting said plate and said yoke to hold said candle filter in operative position, the construction and arrangement being such that the neck on said base and the neck on said casing are slidably engaged by said plate and said yoke, respectively, the candle filter may be readily removed from the holding means, and said casing may be readily removed from said base.

DANA L. BAILEY.
ROBERT C. BARD.

REFERENCES CITED

The following references are of record in the file of this patent:

UNITED STATES PATENTS

| Number | Name | Date |
|---|---|---|
| 780,069 | Sheldon | Jan. 17, 1905 |
| 1,784,622 | Dardani | Dec. 9, 1930 |
| 1,791,046 | Sweetland | Feb. 3, 1931 |
| 1,802,423 | Hemmingsen | Apr. 28, 1931 |
| 1,811,795 | Kirby | June 23, 1931 |
| 2,100,266 | Perry | Nov. 23, 1937 |
| 2,253,686 | Burckhalter | Aug. 26, 1941 |
| 2,376,739 | Walker | May 22, 1945 |
| 2,407,190 | Tait | Sept. 3, 1946 |

FOREIGN PATENTS

| Number | Country | Date |
|---|---|---|
| 735,496 | France | Nov. 9, 1932 |
| 82,082 | Germany | July 11, 1895 |
| 114,696 | Switzerland | May 17, 1926 |